(12) United States Patent
Jaouen et al.

(10) Patent No.: US 9,517,408 B2
(45) Date of Patent: *Dec. 13, 2016

(54) MULTIMODE CONTROLLER FOR VIDEO GAMES

(71) Applicant: Guillemot Corporation S.A., Chantepie (FR)

(72) Inventors: Jean-Yves Jaouen, Saint Jean la Poterie (FR); Patrick Pennaneac'h, Chateaubourg (FR); David Sauvage, Mordelles (FR)

(73) Assignee: GUILLEMOT CORPORATION S.A., Chantepie (FR)

( * ) Notice: Subject to any disclaimer, the term of this patent is extended or adjusted under 35 U.S.C. 154(b) by 116 days.

This patent is subject to a terminal disclaimer.

(21) Appl. No.: 14/305,857

(22) Filed: Jun. 16, 2014

(65) Prior Publication Data

US 2014/0323222 A1    Oct. 30, 2014

Related U.S. Application Data

(63) Continuation of application No. 13/152,705, filed on Jun. 3, 2011, now Pat. No. 8,753,208.

(30) Foreign Application Priority Data

Jun. 3, 2010   (FR) ..................................... 10 54379
Jun. 1, 2011   (EP) ..................................... 11168358

(51) Int. Cl.
*A63F 9/24*    (2006.01)
*A63F 13/00*   (2014.01)
(Continued)

(52) U.S. Cl.
CPC ........... *A63F 13/245* (2014.09); *A63F 13/803* (2014.09); *A63F 2300/1043* (2013.01); *A63F 2300/1062* (2013.01); *A63F 2300/8017* (2013.01)

(58) Field of Classification Search
USPC ........................................... 463/38
See application file for complete search history.

(56) References Cited

U.S. PATENT DOCUMENTS 3,626,780 A   12/1971  Lowder et al.
6,209,408 B1   4/2001  DeJonge et al.
(Continued)

FOREIGN PATENT DOCUMENTS

| EP | 2722561 A1 | 4/2014 |
|---|---|---|
| WO | WO-2004080554 A1 | 9/2004 |
| WO | WO-2006088182 A1 | 8/2006 |

OTHER PUBLICATIONS

Search Report in European Application No. 13177202.2 dated Mar. 21, 2014, 6 pages.

*Primary Examiner* — Kevin Y Kim
(74) *Attorney, Agent, or Firm* — Blakely Sokoloff Taylor & Zafman LLP

(57) ABSTRACT

The invention relates to a controller, in particular for video games, capable of operating according to at least a gear selection mode and a brake mode. According to the invention, said controller comprises a support casing, a lever mounted on said support casing and capable of pivoting from a neutral position around at least an axis, and a detector to detect, in the gear selection mode, at least two different positions of the lever obtained by the pivoting thereof from the neutral position and, in the brake mode, an angular value corresponding to a braking force required by a user by the pivoting of the controller lever according to said axis.

20 Claims, 7 Drawing Sheets

(51) Int. Cl.
    *G06F 17/00*     (2006.01)
    *G06F 19/00*     (2011.01)
    *A63F 13/245*     (2014.01)
    *A63F 13/803*     (2014.01)

(56) References Cited

U.S. PATENT DOCUMENTS

| | | | | |
|---|---|---|---|---|
| 2006/0135257 A1* | 6/2006 | Nourry | ................ | H01H 25/041 |
| | | | | 463/38 |
| 2006/0283279 A1* | 12/2006 | Levin | .................... | F16H 59/044 |
| | | | | 74/471 XY |
| 2007/0082735 A1* | 4/2007 | Bell | ........................ | A63F 13/06 |
| | | | | 463/38 |

* cited by examiner

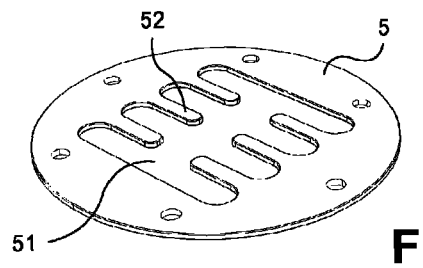
FIG. 7
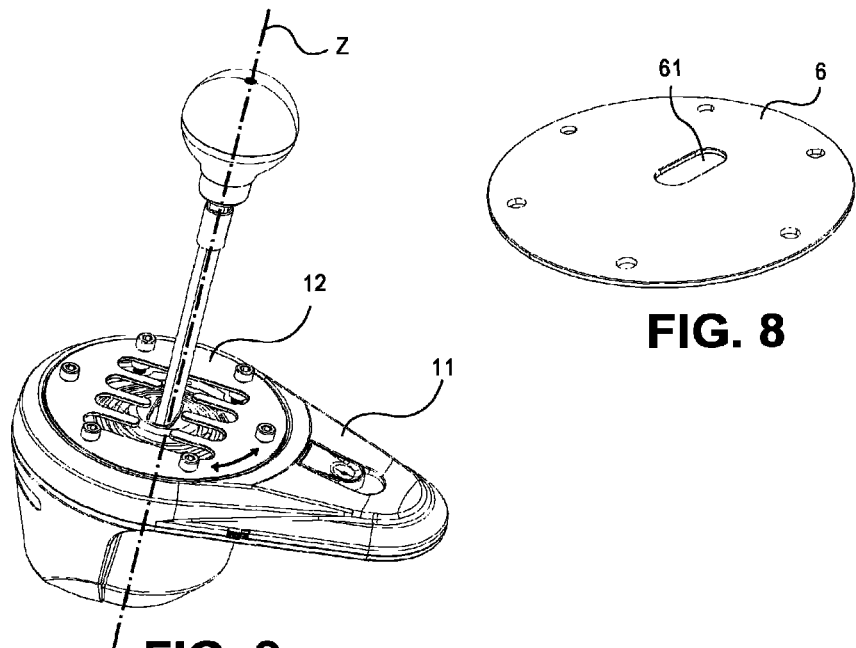
FIG. 8
FIG. 9
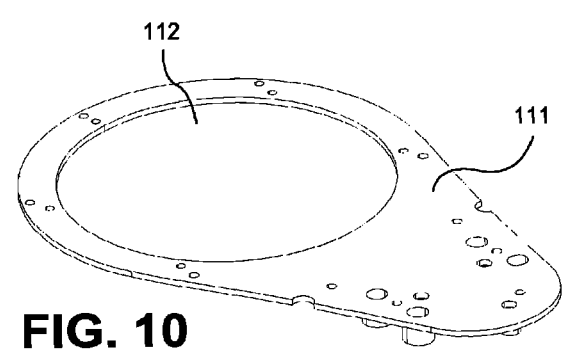
FIG. 10

MULTIMODE CONTROLLER FOR VIDEO GAMES

BACKGROUND

This application is a continuation of U.S. application Ser. No. 13/152,705 filed Jun. 3, 2011, which claims priority to EP application no. 11168358.7 filed Jun. 1, 2011, and French application no. 1054379 filed Jun. 3, 2010.

Field of the Invention

The present invention relates to a speed controller, particularly for a video game, that may operate at least according to a sequential mode and a manual mode.

The invention relates to a speed controller consisting in a controller for video games making it possible to simulate the use of one or more of the members for controlling the speed of a simulated vehicle, that is to say more precisely a controller that generates information corresponding to the activation of a gear shift lever (or shifter), of an accelerator or brake (hand brake, for example) for a simulated vehicle.

More particularly, the invention relates to a speed controller that may operate at least according to a sequential mode and a manual mode, comprising a support casing, a lever hingeably mounted on said support casing and able to pivot, from a neutral position, in a longitudinal direction around a transversal axis and in a transversal direction around a longitudinal axis, the transversal and longitudinal axes being orthogonal, and detection means able to detect, in the manual mode, at least two different positions of the speed controller lever obtained by pivoting the speed controller lever at least in the longitudinal direction from the neutral position and, in the sequential mode, at least two different positions of the speed controller lever.

Background

Such a speed controller is for example described in patent document U.S. Pat. No. 7,650,810. In the sequential mode, the gear shift lever pivots around the transversal axis between two different positions on either side of the neutral position. In order to guide the movement of the gear shift lever between the neutral position and the various positions of the manual mode and/or the sequential mode, the speed controller is provided with a gate comprising a transversal slot also called neutral row and a plurality of longitudinal slots opening into the transversal slot.

In the sequential mode, the user moves the lever in two facing longitudinal slots placed on either side of the neutral position. For the change from the manual mode to the sequential mode, the gate is modified by a sliding mechanism in order to restrict the movement of the gear shift lever to the two aforementioned longitudinal slots. The gate may also be replaced by another gate comprising one single longitudinal slot corresponding to the two facing longitudinal slots.

The implementation of such a speed controller requires, in addition to detection means for detecting all of the positions of the manual mode and the sequential mode, so called transversal elastic return means to elastically bring the speed controller lever back to the neutral position along a transversal direction as well as so called longitudinal elastic return means to elastically bring the speed controller lever back to the neutral position along a longitudinal direction, the longitudinal elastic return means only being of use in the sequential mode.

SUMMARY OF THE INVENTION

One aim of the invention is to propose a new configuration of the speed controller making it possible to reduce the number of components and the cost of the speed controller.

Another aim of the invention is to provide such a speed controller with improved ergonomics.

Another aim of the invention, according to at least one embodiment, is to provide a multi-mode speed controller able to alternately simulate the operation of the various members for controlling the speed of a simulated vehicle while preserving the realism of the video games.

Another aim of the invention is to provide such a speed controller, whose modifications with respect to the prior art are simple and inexpensive to implement.

According to at least one embodiment, the aim of the invention is also to provide a speed controller which can be easily attached to different supports and the positioning of which on the support may be easily modified.

Another aim of the invention is to provide a speed controller that is precise to use.

According to at least one embodiment, the aim of the invention is also to provide a speed controller with a relatively reduced encumbrance.

To this end, the present invention relates to a speed controller, particularly for video games, capable of being operated at least according to a sequential mode and a manual mode, comprising a support casing, a lever that is hingeably mounted on said support casing and capable of pivoting, from a neutral position, in a longitudinal direction around a transversal axis and in a transversal direction around a longitudinal axis, and detection means capable of detecting, in the manual mode, at least two different positions of the speed controller lever obtained by pivoting the speed controller lever in at least said longitudinal direction from the neutral position and, in the sequential mode, at least two different positions of the speed controller lever shifted with respect to the neutral position, said speed controller being characterized in that the detection means are able to detect, in the sequential mode, at least two different positions of the speed controller lever obtained by pivoting said lever in said transversal direction from the neutral position.

Thus, according to the invention, the positions of the speed controller lever in the sequential mode are obtained by moving the speed controller lever in a direction corresponding to the neutral row of the speed controller. Thus, it is not necessary to provide the speed controller with longitudinal elastic return means.

Advantageously, the manual mode comprises at least four positions, for example 6 or 8 positions.

According to a particular embodiment, the speed controller further comprises a first gate mounted or able to be mounted on said support casing, said first gate comprising, for the passage of the speed controller lever, a transversal slot (neutral row of the manual mode) and at least two longitudinal slots opening into said transversal slot, said transversal slot being positioned and sized to guide the speed controller lever between the neutral position and said at least two positions of the sequential mode and said longitudinal slots being positioned and sized to guide the speed controller lever between the transversal slot and said at least four positions of the manual mode.

According to a particular embodiment, the first gate is a removable gate. In this embodiment, the speed controller lever comprises, at its upper free end, a knob removably attached to the rod of said lever in order to make it possible to remove the first gate.

According to a particular embodiment, the speed controller lever has in the sequential mode two different positions arranged on either side of the neutral position, the transversal slot of the first gate being sized such that said two different positions are reached by moving the speed controller lever towards the ends of said transversal slot, said two different positions being reached before or in abutment against the ends of the transversal slot.

Advantageously, the speed controller comprises a second removable gate able to be mounted on the support casing or, alternatively, on said first gate, said second gate comprising for the passage of the speed controller lever, one single transversal slot, said transversal slot of said second gate being sized such that, when the speed controller lever has in sequential mode two different positions arranged on either side of the neutral position, said two different positions are reached by moving the speed controller lever towards the ends of said transversal slot.

Advantageously, the length of the transversal slot of the second gate is lower than the length of the transversal slot of the first gate, said two different positions of the sequential mode being reached when the speed controller lever abuts against the ends of the transversal slot of the second gate. The length of the transversal slot of this second gate is determined to obtain a short travel for the sequential mode.

The speed controller lever comprises elastic return means to bring back the speed controller lever elastically from said at least two positions of the sequential mode towards said neutral position.

According to an advantageous embodiment, the support casing comprises a stationary set, preferably equipped with fixing means, to be fixedly mounted, in a way that can be detached, on a support such as a table, and a movable set whereon the speed controller lever is hingeably mounted, said movable set being mounted rotatable on said stationary set around a rotational axis substantially perpendicular to said transversal axis and said longitudinal axis.

The movable set may also be integrated into the casing of a video game controller for example, in the casing of a steering wheel. In this case, said movable set is mounted movable in rotation with respect to the casing of said video game controller, said casing thus constituting the stationary set, and the video game controller with the integrated speed controller thus constituting the support casing.

The ergonomics of the speed controller is improved as the rotation of the movable set makes it possible to adjust, depending on the location of the speed controller and the user needs, the direction of the slots of the gate or gates with respect to the support whereon the movable set is fixed. The user may thus pivot the speed controller lever more easily.

During the change from the manual mode to the sequential mode, the user may also pivot the movable set around its rotational axis, preferably at 90°, to modify the orientation of the transversal axis and thus the orientation of the neutral row of the manual mode, of the speed controller and improve its ergonomics.

According to a particular embodiment, the stationary set comprises a support plate provided with a substantially circular opening through which said movable set is mounted movable in rotation.

The movable set comprises a rim movable in rotation around the rotational axis in the opening of the support plate, the inner passage of the rim being traversed by the speed controller lever, and a support frame, fixed to the lower wall of said rim, the speed controller lever being pivotally hinged around said transversal axis and said longitudinal axis via articulation means.

According to a particular embodiment, the support frame is U shaped and comprises a base and two parallel lateral branches extending from said base and said articulation means are mounted between the lateral branches of the support frame. The first gate is thus mounted on an upper wall of the rim.

Advantageously, the support casing comprises means for rotationally locking said movable set on the stationary set.

According to a particular embodiment, the rotationally locking means are able to lock said movable set in at least a manual position and a sequential position that are angularly shifted by 90° from each other.

The rotationally locking means comprise a catch mounted movable in translation on said support plate and able to cooperate with at least two recesses provided in the outer wall of the rim and angularly shifted to lock the rotation of said rim.

The detection means preferably comprise a unique Hall-effect sensor associated to a magnet, said Hall-effect sensor being mounted on a member among the lower free end of the speed controller lever and the support casing, said magnet being mounted opposite from said Hall-effect sensor on the other member among the lower free end of the speed controller lever and the support casing.

Advantageously, this Hall-effect sensor is mounted on the movable set, particularly on the base of the support frame of said movable set, and the magnet is mounted opposite from said Hall-effect sensor on the lower end of the speed controller lever.

Alternatively, the Hall-effect sensor of said detection means is mounted on the lower end of the speed controller lever and the magnet is mounted opposite from said Hall-effect sensor on the stationary set, particularly on the base of the support frame.

Finally, the support casing advantageously comprises fixing means, for example U-bolt or clamp type fixing means, for fixing said support casing to a piece of furniture such as a table or a desk.

The main application of the speed controller of the invention is used to simulate a speed selecting apparatus that may operate according to a sequential mode and a manual mode.

According to another application, the speed controller of the invention is used to simulate a hand brake.

According to another application, the speed controller of the invention is used to simulate both a hand brake and a manual accelerator.

BRIEF DESCRIPTION OF THE DRAWINGS

The invention will be better understood and other objects, details, characteristics and advantages will become more apparent from the following detailed explanatory description, with reference to the accompanying drawings, among which:

FIG. 7 represents on its own a perspective view of a gate for the manual mode;

FIG. 8 represents on its own a perspective view of a gate for the sequential mode;

FIG. 9 is a perspective view similar to that of FIG. 1 wherein the fixing system of the speed controller has been removed;

FIG. 10 represents on its own a perspective view of a support plate of the speed controller.

DETAILED DESCRIPTION

Figure 1:
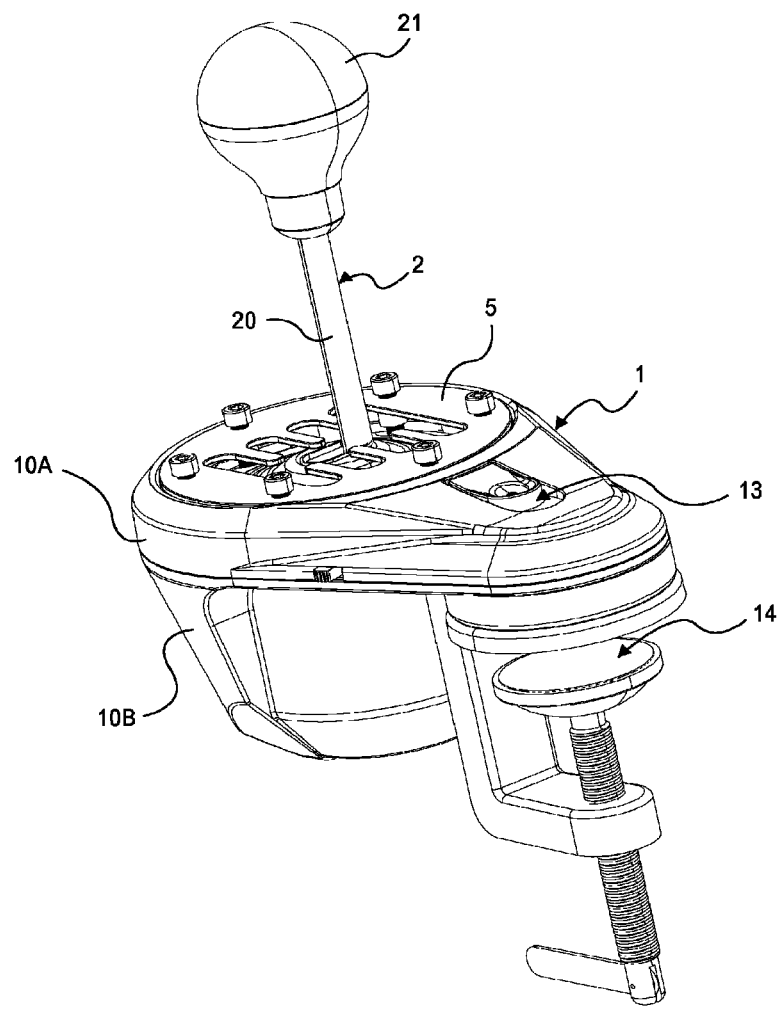
FIG. 1 is an overall perspective view of a speed controller in accordance with the invention wherein the speed controller is provided with a gate for operating in a manual mode and possibly in sequential mode.
Figure 2:
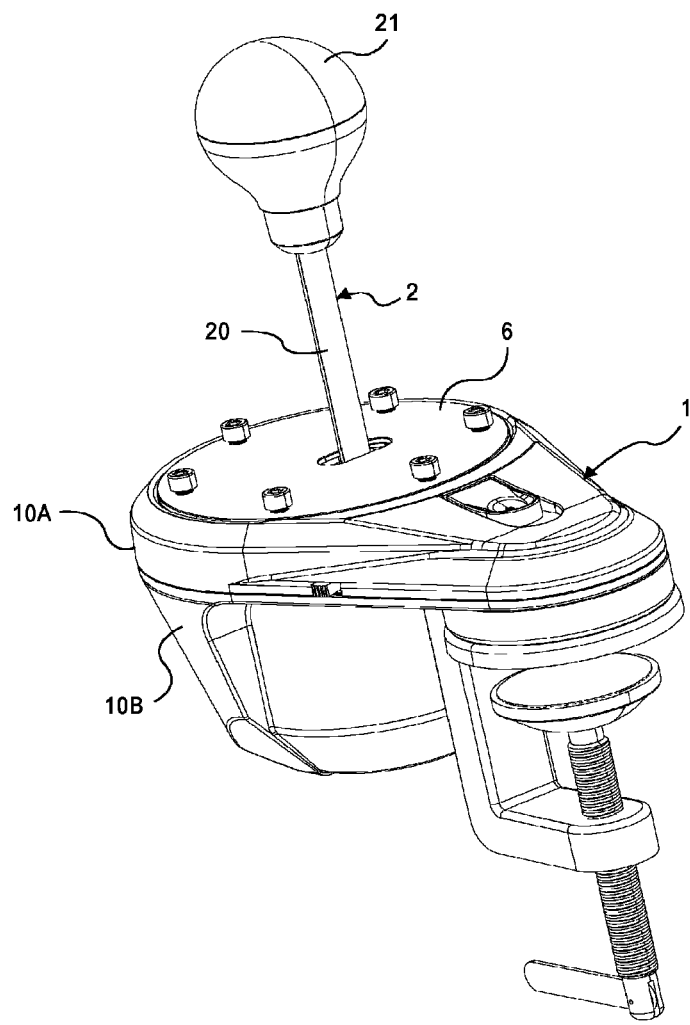
FIG. 2 an overall perspective view of a speed controller in accordance with the invention wherein the speed controller is provided with a gate for operating in the sequential mode.

The invention relates to a speed controller for video games which may operate in a manual mode, also called H mode, and a sequential mode, also called automatic mode.

The term "video game" in particular encompasses recreational video games, serious games and vehicle driving or piloting simulator software.

With reference to FIGS. 1 to 4, the speed controller comprises:
- a support casing 1,
- a lever 2 comprising a rod 20 equipped at its upper free end with a preferably removable knob 21,
- means 3 for articulating the speed controller lever to make it possible to pivot the lever 2, from a neutral position, in a longitudinal direction around a transversal axis Y and in a transversal direction around a longitudinal axis X, and
- detection means 4 capable of detecting, in the manual mode, the neutral position and eight different positions of the lever 2 obtained by pivoting the lever 2 in the longitudinal direction and the transversal direction from the neutral position and, in the sequential mode, the neutral position and two different positions of the lever 2 transversally shifted with respect to the neutral position and obtained by pivoting the lever 2 in said transversal direction from the neutral position.

Thus, in the sequential mode, the user moves the speed controller lever along the neutral row of the lever 2. As will be seen further down, this new configuration particularly makes it possible to use already-existent transversal elastic return means of the speed controller to bring back, in the sequential mode, the lever 2 towards the neutral position.

Figure 5:
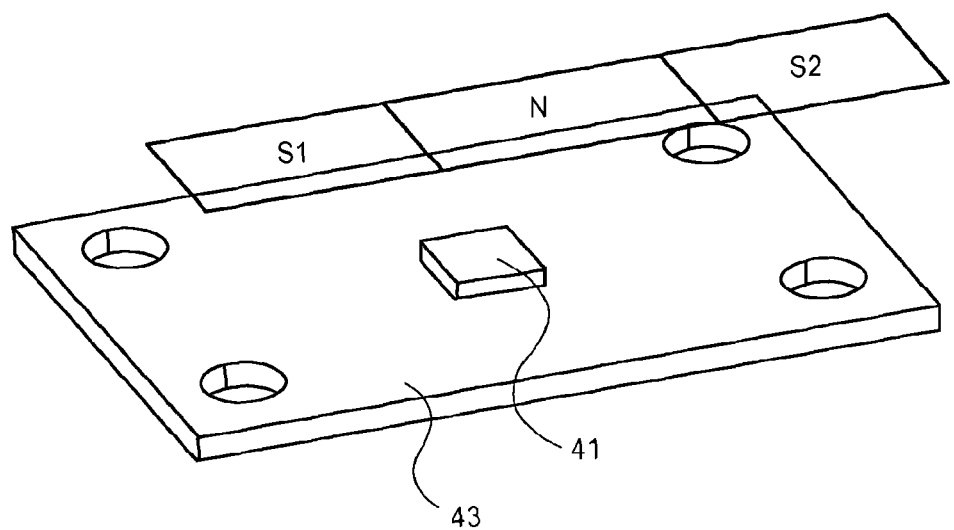
FIG. 5 represents, by way of example, positions of the speed controller lever detected by a three-axis Hall-effect sensor for the sequential mode.
Figure 6:
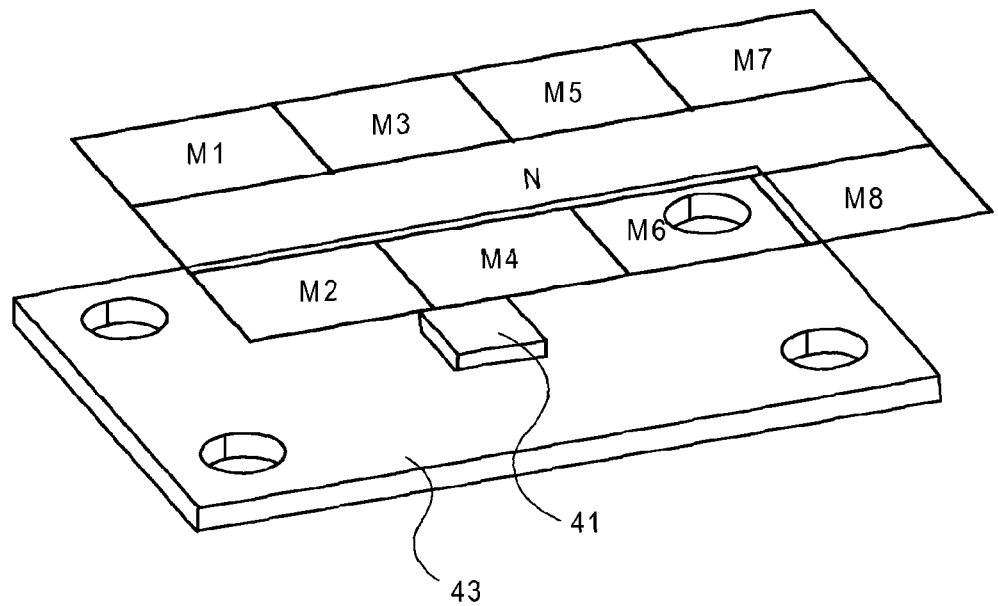
FIG. 6 represents, by way of example, positions of the speed controller lever detected by a three-axis Hall-effect sensor for the manual mode.

The different positions of the speed controller lever in the manual mode and in the sequential mode are illustrated by FIGS. 5 and 6. In addition to the neutral position referenced N, the sequential mode comprises two positions, referenced S1 and S2, arranged on either side of the neutral position N, and the manual mode comprises eight positions referenced M1 to M8, each two facing each other with respect to the neutral position N. Each one of these positions corresponds to a particular position of the lower end of the speed controller lever 2.

The support casing 1 is provided, in its upper portion, with a preferably removable gate 5, for guiding the travel of the speed controller lever between the neutral position and the different positions of the speed controller lever in both manual and sequential modes. It also comprises an upper cover 10A and a lower cover 10B assembled by clipping or screwing.

Gate 5 is mounted on the support casing 1 and comprises, for the passage of the lever 2, a transversal slot 51 and eight longitudinal slots 52 each opening into the transversal slot as illustrated on FIG. 7. The transversal slot 51 is positioned and sized in order to guide the travel of the lower free end of the lever 2 between the neutral position N and the two positions S1 and S2 of the sequential mode. Likewise, each one of the longitudinal slots 52 is positioned and sized in order to guide the travel of the lower free end of the speed controller lever between the transversal slot 51 and one of the positions M1 to M8 of the manual mode.

These positions are detected by the detection means 4. These detection means comprise a three-axis Hall-effect sensor 41 associated to a magnet 42. A three-axis Hall-effect sensor provides great precision typically greater than that of a potentiometer or an optical encoder. Its encumbrance is also lower. The three-axis Hall-effect sensor 41 is mounted on a printed circuit board 43, itself mounted on a stationary portion of the support casing, and the magnet 42 is mounted on the lower free end of the lever 2 opposite to the Hall-effect sensor.

According to an alternative, the Hall-effect sensor 41 is mounted on the lower free end of the lever 2 and the magnet 42 is mounted opposite to the Hall-effect sensor on a stationary portion of the support casing.

Advantageously, the speed controller comprises a second removable gate 6 which may be mounted on the support casing 1 over gate 5 or to replace gate 5, this second gate being specifically designed for the sequential mode to guide the travel of the lower free end of the lever 2 between the neutral position N and the two positions S1 and S2 of the sequential mode. As illustrated in FIG. 8, the gate 6 only comprises a transversal slot 61 sized in order to allow for the travel of the speed controller lever lower free end only between neutral position N and positions S1 and S2 in the sequential mode.

Advantageously, the length of the transversal slot 61 is lower than the length of the transversal slot 51 to reduce the travel of the speed controller lever in the sequential mode, the positions S1 and S2 thus being reached when the speed controller lever 2 is in abutment against the ends of the transversal slot 61.

Alternatively, instead of gate 6, shutters which may cover at least partially the longitudinal slots 52 of the gate 5 in order to guide the speed controller lever in the sequential mode may be provided.

In order to modify the orientation of the neutral row and improve the ergonomics of the speed controller, the support casing 1 comprises a stationary set 11 and a movable set 12 whereon the speed controller lever is hingeably mounted. The movable set 12 is mounted movable in rotation on the stationary set around a rotational axis Z which is substantially perpendicular to axes X and Y as illustrated in FIG. 9.

The stationary set 11 comprises a support plate 111 provided with a circular opening 112 through which the movable set 12 is mounted movable in rotation. This plate is shown on its own in FIG. 10. In this figure, the external outline of the support plate 111 is oval such that the support plate 11 is rotationally locked with respect to the upper cover 10A and/or the lower cover 10B. It could be of different shape.

The movable set 12 comprises a circular-shaped rim 120, movable in rotation around axis Z in the opening 112 and a support frame 121 fastened to the lower wall of the rim. The rim defines an inner passage traversed by the speed controller lever.

Figure 11:
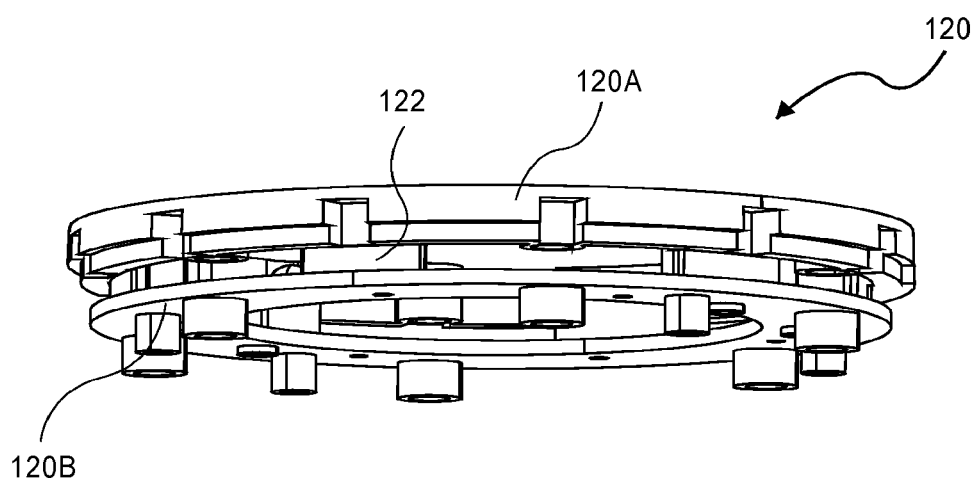
FIG. 11 represents on its own a perspective view of a rim of the speed controller.

As illustrated in FIG. 11, the rim 120 is made of an upper rim 120A and a lower rim 120B. The lower rim 120B is provided for rotating around axis Z inside the opening 112. To this end, the external diameter of the lower rim 120B is substantially equal to the diameter of the opening 112. The upper rim 120A rests upon studs 122 on the lower rim 120B.

The gate 5 is mounted on the upper wall of the upper rim 120A. Fixing screws 123 are provided for fixing gate 5, and/or if necessary gate 6, on the upper rim 120A. These screws also serve for fixing upper rim 120A on the lower rim 120B.

Figure 3:
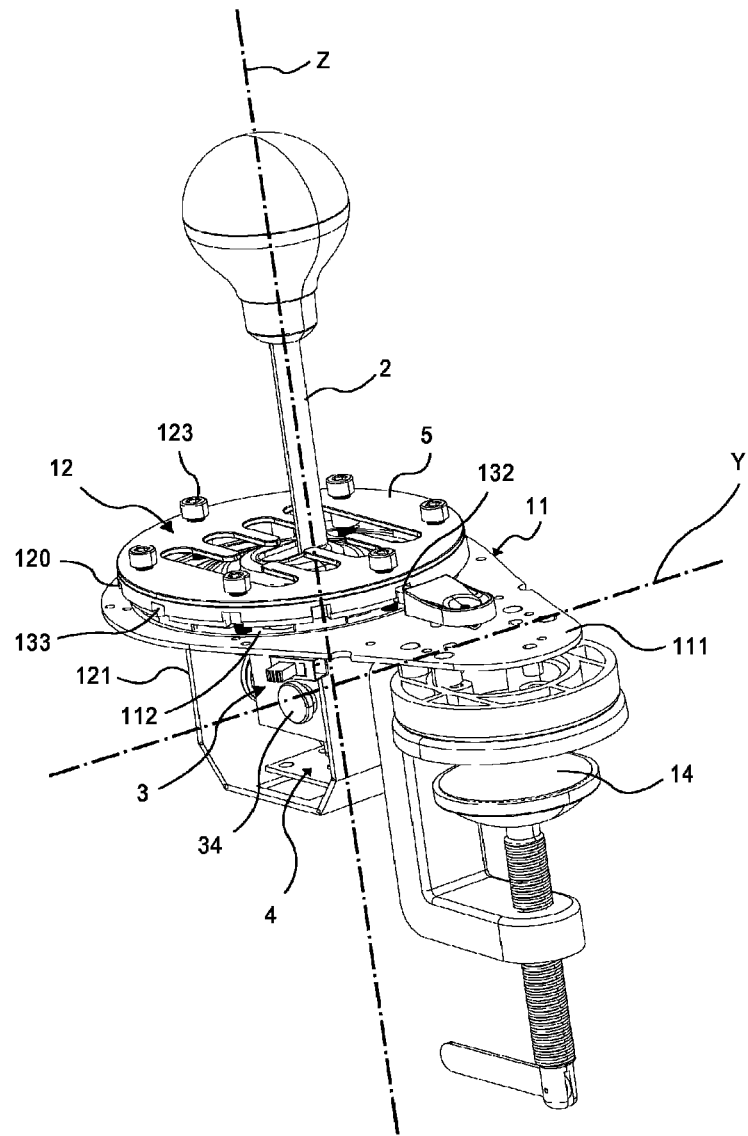
FIG. 3 is a perspective view of the speed controller of FIG. 1 wherein the upper cover and the lower cover of the speed controller have been removed.
Figure 4:
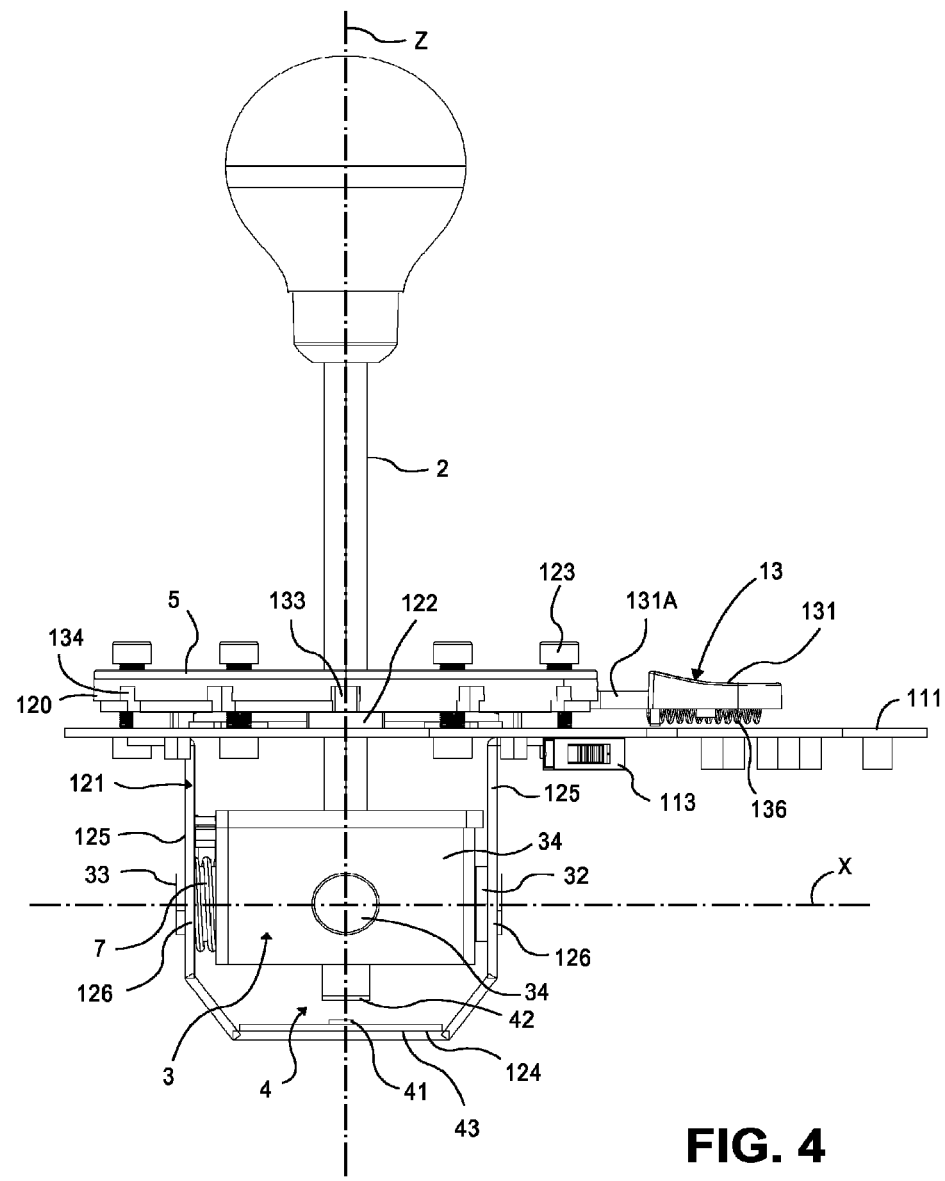
FIG. 4 is a front view of the speed controller of FIG. 3 without the fixing means.

As shown in the FIGS. 3 and 4, the support frame 121 is generally U shaped. It comprises a base 124 and two parallel lateral branches 125 extending from the base. The printed circuit board 43 supporting the three-axis Hall-effect sensor 41 is mounted on the upper side of the base 124. Furthermore, the means 3 for articulating the speed controller lever are placed between the two lateral branches 125.

As specifically shown in FIG. 4 the means 3 for articulating the speed controller lever comprise a casing 31 pivotally mounted between the two lateral branches 125 by means of two pivots 32 and 33 arranged on two lateral walls of the casing 31. These two pivots are placed on the longitudinal axis X and are provided to cause the casing 31 to pivot around the axis X. These two pivots are rotatably mounted within the openings 126 provided in the lateral branches 125. The casing 31 further comprises a shaft 34 defining the transversal axis Y. This shaft is mounted between two longitudinal walls of the casing. The shaft 34 is provided to pivot within openings provided in the longitudinal walls of the casing. This pivoting assembly is known per se. The casing 31 also comprises known means (not shown) capable of maintaining the speed controller lever in one of the positions M1 to M8 in the manual mode.

Elastic return means 7 are mounted between the casing 31 and the support frame 121 to elastically bring the speed controller lever towards the neutral position. Such transversal elastic return means already exist in current gear shift boxes to return a gear shift lever back towards the neutral position along a transversal direction. Usually, they are only useful in the manual mode. According to the invention, they are also useful in the sequential mode.

The support casing 1 also comprises means 13 for locking in rotation the movable set 12 onto the stationary set 11. The locking means 13 are able to lock the movable set in at least two locking positions, namely a so-called manual position for the manual mode and a so-called sequential position for the sequential mode, angularly shifted by 90° from each other.

To this end, the locking means 13 comprises a catch 131 mounted movable in translation on a support plate 111 and capable of cooperating with at least two recesses 132 and 133 provided in the external wall of the upper rim 120A to lock the rotation of the rim. Recesses 132 and 133 are angularly shifted by 90°. The catch 131 is provided with a spur 131A capable of being engaged in recess 132 in order to lock the movable set in the manual position. The spur 131A further engages into the recess 133 in order to lock the movable set in the sequential position. Additional recesses 134 are also provided in the upper rim to rotationally lock the movable set into other angular positions. A return spring 136 is provided to maintain the catch 131 in recesses 132, 133 or 134.

Alternatively, the catch 131 is cancelled so as to avoid the mechanical looseness caused by such a locking means. It is replaced by another locking means for example, by a tightening carried out by two screws acting between the upper rim 120A and the lower rim which is secured to the support frame 121. After tightening, the screw heads are located in housings made in the upper rim such as not to overlap the upper surface thereof. These screws cross the opening 112 of the support plate 111. The upper rim and the lower rim are thus provided to rotate around axis Z. In this alternative, the external diameter of the upper rim and lower rim is substantially higher than the diameter of the opening 112. Consequently, by tightening these screws, the upper rim 120A (the studs of the upper rim) and the lower rim tightly press the support plate 111 between them. It is thus understood that after having loosened these screws, the upper rim and the support frame 121 may pivot with respect to the support plate 111. The advantage of such a locking means is that it does not restrict the number of angular positions that may be adopted by the movable set.

The support casing 1 also comprises U-bolt type or clamp type fixing means 14 for attachment to a piece of furniture, such as a table, a desk or any support inside a cockpit/driver compartment/pilot house. These fixing means make it possible to easily modify the location of the speed controller by loosening the means 14.

In order to prevent foreign bodies from entering the speed controller mechanism, means for shutting-off opening 112 are advantageously provided, for example rubber bellows comprising an opening for the rod 20 or two thin brushes arranged on either side of the neutral row. These shut-off means become deformed when the lever 2 substantially leaves the rest position and resume their form when the lever 2 returns to the rest position.

Advantageously, the area of the rod 20 which may contact gates 5 and/or 6 is covered with a Teflon ring to limit friction between these pieces.

In a particular embodiment, the rod 21 is hollow and the knob 21 houses a known device for generating vibrations or shocks consisting for example, in a movable mass and an electric motor supplied in power and controlled by the processing circuit or an external device for processing data. The aim of this vibration or shock generating device is to cause a user to feel the vibrations of the simulated vehicle when he/she is holding the lever, for example vibrations corresponding to a sub-regime or a shock corresponding to the shifting of a gear, or even vibrations simulating the implementation of an anti lock brake system, etc.

A mode selector button 113 is provided at the support plate so that the user may select the operating mode of the speed controller: manual mode or sequential mode.

Alternatively, a device for automatically detecting the rotation of the movable set 12 to change from the manual mode to the sequential mode or vice versa may be provided.

According to another alternative, instead of or in addition to a device for automatically detecting the rotation of the movable set 12, a device for automatically detecting the presence or absence of a gate that is specific to a speed controller mode may be provided in order to change automatically from one mode to another. To this end, one or several presence sensors for example, of push button type or rubber carbon-contact dome type, may be housed in the rim 120. Each presence sensor opens or closes a circuit according to whether an object of the gate, for example a protrusion positioned at a specific location on the gate, exerts pressure on the sensitive portion of the presence sensor and thus sufficiently deforms a flexible blade or the rubber dome to change the status of the sensor, thus making it change from an open status to a closed status or vice versa.

Furthermore, the signals issued from the Hall-effect sensor 41 and the selector button 113 are transmitted towards a processing circuit that is not shown which can be embedded or not within the speed controller. The Hall-effect sensor 41 may also be integrated within the processing circuit.

The speed controller has been described above as a speed selecting apparatus capable of operating according to a manual mode and a sequential mode.

According to another application, the speed controller of the invention is used to simulate a hand brake. In this application, the lever 2 pivots around the longitudinal axis X, in a transversal direction between two different positions, a first position corresponding to the absence of braking and a second position transversally shifted from the first position corresponding to a maximum braking. The first position advantageously corresponds to the neutral position of the speed controller when it operates as a speed selecting apparatus.

In this application, the user moves the lever in the transversal slot (neutral row) to control the braking and, if the first position corresponds to the previously defined neutral position N, the lever pivots in the transversal slot only on one side of the neutral position.

In another application, the speed controller may be used both as a hand brake and a manual accelerator. In this application, the user also preferably uses the neutral row of the manual mode for the travel of the lever 2. The lever 2 pivots around the longitudinal axis X, in a transversal direction, between two positions on either side of the neutral position. A first position is the maximum speed control position and the second position is the maximum braking control position. Preferably, the second position is opposed to the first position with respect to the neutral position. Thus, in this application, the lever pivots in the transversal slot on either side of the neutral position.

Whether it be to simulate a speed selecting apparatus, an accelerator or a brake (hand brake, for example), the speed controller is used for detecting at least two different positions of the speed controller lever and these positions correspond to a speed parameter of the simulated vehicle. In these different applications, the speed controller such as previously described acts to control the speed. In the first application, the speed controller is used to select a gear. In the handbrake application, the speed controller is used to select the braking force to be opposed to the rotation of the vehicle wheels, which is also equivalent to controlling the speed of this vehicle. In the brake and accelerator application, the speed controller is used to select the required motor power, which is also equivalent to controlling the vehicle speed.

The selector button 113 is used to select the required operating mode: speed selection manual mode, speed selection sequential mode, hand-brake only mode or hand brake and accelerator mode.

Hereinafter, the use of the speed controller of the invention in the hand brake application as well as the possible modifications which may be brought to it for this application will be described.

In this application, the lever 2 travels in the transversal slot (neutral row of the manual mode). The transversal elastic return means 7 are used to bring the lever 2 towards the neutral position corresponding to the absence of braking It is worth noting that it is not necessary to provide means for locking the lever 2 in its brake position in this hand brake application. In fact, the usefulness of a parking position, wherein the lever 2 is locked into maximum brake position, is low for most video games.

The rest position of the lever 2 (when the user is not exerting action on the lever) is located in the neutral row at the intersection with the longitudinal direction corresponding to referenced positions M3 and M4. In FIGS. 1 and 3, the lever 2 is represented in the rest position. The rest position of lever 2 is thus shifted with respect to the middle of the neutral row. When the speed controller is used as hand brake, the user moves the lever 2 along the neutral row of the speed controller. The shifting of the rest position with respect to the middle of the neutral row makes it possible to obtain a greater travel of the lever on one side of the rest position. When the speed controller is used as a hand brake, the lever 2 thus travels on the side of the rest position which offers a longer clearance for the lever, thus allowing a more precise selection of the braking force.

For this application, the speed controller comprises a third removable gate which may be mounted on the support casing 1, instead of gate 5, or over gate 5, this third gate being specifically designed to guide the travel of the lower free end of the lever 2 between the neutral position N (position of the lever 2 in abutment against a first end of the slot, and substantially corresponding to the rest position of the lever 2) and the maximum braking position (position of the lever 2 in abutment against the other end of the slot). This third gate solely comprises a transversal slot sized to allow, in the hand-brake only mode, the travel of the lower free end of the speed controller lever only between these two positions. Advantageously, the length of the slot of this third gate is comprised between the length of slot 51 and the length of the slot 61. However, the slot of this third gate may be longer than slot 51 in order to give the lever 2 a greater travel.

It is possible to provide, at the end of the transversal slot of the third gate, a longitudinal slot opening into the transversal slot in order to lock the lever 2 thereto in the maximum braking position. This longitudinal slot makes it possible to simply create a parking position for the simulated vehicle.

When the lever 2 of the speed controller is used as a speed selecting lever, the speed controller provides digital information. In other words, when the lever 2 is used as a gear shift lever, the speed controller provides information on the state (1 or 0) corresponding to each position N and M1 to M8 in the manual mode or to each position N and S1 to S2 in the sequential mode. For example, if lever 2 is used as a gear shift lever in the sequential mode, and when the speed controller lever is in the position corresponding to S1, the speed controller provides the information S1=1, N=0 and S2=0.

Preferably, when the speed controller is used as a hand brake, the speed controller provides analog information to have more precision as to the braking force required by the user. In other words, when the lever 2 is used as a hand brake lever, the speed controller provides a value comprised in an interval, for example a value ranging between 0 and 256, corresponding to the angular position of the lever 2, the value 0 corresponding for example to the neutral position of the lever (no braking of the wheels of the simulated vehicle) and the value 256 corresponding to the position of the lever 2 in abutment against the end which is opposite from the neutral position (maximum braking of the wheel speed of the simulated vehicle).

Advantageously, the speed controller is provided with an ergonomic accessory that substantially reproduces the shape of the hand brake lever and is placed on the rod 20 instead of the knob 21 for this hand brake application.

In a particular embodiment, the presence of this accessory is detected by the presence sensors of the automatic detection device to switch automatically to the hand-brake only mode.

It has to be noted that the speed controller may also provide additional information such as the rotation speed of lever 2. This information may be used by the video game to generate particular effects (for example, a vibration effect and the sound of the creaking of a gearbox) more or less loud depending on the rotation speed of the lever (and the stroke measured on the clutch pedal for example).

Whatever the use mode of the speed controller, the signals generated from the Hall-effect sensor 41, are translated by the processing circuit with its firmware into output signals comprising information or parameters that can be used by a game console, a computer or another external data-processing device. The nature and number of parameters that can be used depend in particular on the video game. Based on the information generated from the Hall-effect sensor 41, the firmware determines the characteristics of the lever 2 travel with respect to the three-axis Hall-effect sensor 41 (angular values, speeds, etc.) and thus with respect to the support frame 121. According to the operating mode of the speed controller, it converts certain of these characteristics by attributing to the lever 2 a lever position in the manual mode (M1-M8 or N) or a position in the sequential mode (S1-S2 or N) or a value corresponding to a predetermined integer.

Advantageously, a firmware may be updated. To this end, the processing circuit comprises a reprogrammable and erasable non-volatile memory.

The firmware makes it possible to calibrate each position of the speed controller lever. More precisely, it makes it possible to attribute to a detected or computed data range (such as angular values according to axes X and Y, speeds of rotation, etc.) a position of the speed controller lever. For example, it determines that the lever is in the M3 position when the detected angular value ranges between the predetermined angular values A1 and A2, that it is in the neutral position when the detected angular value ranges between predetermined angular values A2 and A3, and it is in position M4 when the detected angular value ranges between predetermined angular values A3 and A4. The firmware may thus be adjusted to particularly simulate shorter gears and faster gear shifting. In fact, it is understood that a relatively small travel of lever 2 is sufficient to modify the detected angular value and cause it to change the range, and consequently, it is sufficient to choose bounds [A1, A2], [A2, A3] or [A3, A4] of the detected value range according to the location from which, over the travel stroke of the lever, the gear changing is to be activated. It is also understood that, likewise, in the hand-brake only mode, the firmware makes it possible to calibrate the neutral position and the opposite position (maximum braking position). This makes it possible to determine from which angular position a braking starts to be exerted and from which angular position the braking is at its maximum.

The speed controller may be provided with a configuration program particularly for updating the firmware. This program may also be transmitted to video game software editors so that it is embedded in their video game software. This configuration program comprises for example boxes to tick in order to activate, for example a hand brake mode, a short gear manual mode, or even short gears sequential mode.

Although the invention has been described in connection with a particular embodiment, it is to be understood that it is in no way limited thereto and that it includes all the technical equivalents of the means described as well as their combinations should these fall within the scope of the invention.

The invention claimed is:

1. A controller, in particular for video games, capable of operate according to at least a gear selection mode comprising:
   a support casing,
   a lever mounted on said support casing and at least capable of pivoting, from a neutral position, around a first axis (Y) and around a second axis (X), the second axis (X) being substantially right angled with respect to the first axis (Y), and
   detection means capable of detecting, in the gear selection mode, at least two different positions of the controller lever obtained by pivoting the controller lever around at least said first axis (Y) from the neutral position in at least a gear selection mode direction in which the controller lever moves substantially at right angle to a gear selection mode neutral row, and,
   characterized in that said controller is capable of operate according to a brake mode, and,
   in that, in the brake mode, the controller lever is capable of pivoting around said second axis (X) in a brake mode direction, in such a way that, in said brake mode direction, the controller lever moves substantially along said gear selection mode neutral row.

2. The controller according to claim 1, characterized in that said detection means are capable of detecting, in the brake mode, at least two different positions of the controller lever.

3. The controller according to claim 2, characterized in that it comprises a removable gate capable of being mounted on the support casing or, alternatively, on a gate having a first slot for the gear selection mode neutral row and one or more slots each substantially right angled with respect to the first slot and opening in the first slot for the gear selection mode direction,
   said removable gate comprising a brake mode slot for the passage of the controller lever,
   the slot of said removable gate being sized such that, in the brake mode, the neutral position is at a first end of said slot and a braking position is reached by moving the controller lever in the brake mode direction towards the other end of said slot.

4. The controller according to claim 3, characterized in that the length of the slot of the removable gate is lower than the length of the first slot of the gear selection mode neutral row.

5. The controller according to claim 1, characterized in that the support casing comprises:
   a stationary set to be fixedly mounted on a support such as a table, and
   a movable set on which said controller lever is hingeably mounted, said movable set being movable in rotation on said stationary set around a rotational axis (Z) substantially perpendicular to said first axis (Y) and said second axis (X).

6. The controller according to claim 5, characterized in that said stationary set comprises a support plate provided with a substantially circular opening through which said movable set is mounted movable in rotation.

7. The controller according to claim 6, characterized in that said movable set comprises:

a rim movable in rotation around said rotational axis (Z) in the opening of the support plate, the inner passage of said rim being traversed by the controller lever, and a support frame, fixed to the lower wall of said rim, the controller lever being pivotally hinged around said first axis and said second axis via articulation means.

8. The controller according to claim 7, characterized in that the support frame is U shaped and comprises a base and two parallel lateral branches extending from said base and in that said articulation means are mounted between the lateral branches of the support frame.

9. The controller according to claim 1, characterized in that the neutral position is shifted with respect to the middle of the gear selection mode neutral row.

10. The controller according to claim 5, characterized in that the support casing comprises means for rotationally locking said movable set with respect to the stationary set.

11. The controller according to claim 10, characterized in that the rotationally locking means are capable of locking said movable set in at least a gear selection mode position and a brake mode position angularly shifted by 90° from each other.

12. The controller according to claim 2, characterized in that said detection means comprise a Hall-effect sensor associated to a magnet, said Hall-effect sensor being mounted on a member among the lower free end of the controller lever and the support casing, said magnet being mounted facing said Hall-effect sensor on the other of the lower free end of the controller lever and the support casing.

13. The controller according to claim 5, characterized in that a Hall-effect sensor is mounted on the movable set and a magnet is mounted facing said Hall-effect sensor on the lower end of the controller lever.

14. The controller according to claim 1, characterized in that said support casing comprises fixing means, of U-bolt type or clamp type for example, for fixing said support casing to a piece of furniture such as a table or a desk.

15. A video game controller, capable of operate according to at least a gear selection mode comprising:

a support casing, a lever mounted on said support casing and at least capable of pivoting, from a neutral position, around a first axis (Y) and around a second axis (X), the second axis (X) being substantially right angled with respect to the first axis (Y), and detection means capable of detecting, in the gear selection mode, at least two different positions of the controller lever obtained by pivoting the controller lever around at least said first axis (Y) from the neutral position in at least a gear selection mode direction in which the controller lever moves substantially at right angle to a gear selection mode neutral row, and, characterized in that said controller is capable of operate according to a brake mode in said gear selection mode neutral row, and, in that, at least in the brake mode, the detection means are capable of detecting the angular value according to the second axis (X) of the controller lever.

16. A video game controller according to claim 15, characterized in that, said detection means comprise a Hall-effect sensor associated to a magnet, said Hall-effect sensor being mounted on a member among the lower free end of the controller lever and the support casing, said magnet being mounted on the other of the lower free end of the controller lever and the support casing, and said Hall-effect sensor and said magnet being substantially aligned according to a third axis (Z) substantially perpendicular to said first axis (Y) and said second axis (X).

17. A video game controller according to claim 15, characterized in that the controller embeds a firmware to modify at least two bounds of said angular value, in such a way to calibrate the video game controller.

18. A video game controller according to claim 15, characterized in that, the neutral position is shifted with respect to the middle of the neutral row.

19. A controller, in particular for video games, capable of operate according to at least a sequential mode and a manual mode comprising:

a support casing, a lever mounted on said support casing and at least capable of pivoting, from a neutral position, at least around a first axis, and detection means capable of detecting, in the manual mode, at least two different positions of the controller lever obtained by pivoting the controller lever from the neutral position in at least a manual mode direction, and, characterized in that said controller is capable of operate according to a brake mode, and, in that, in the sequential mode, the detection means are capable of detecting at least two different positions of the controller lever obtained by pivoting the controller lever in a sequential mode direction from the neutral position around the first axis, and in the brake mode, the detection means are capable of detecting at least the angular position of the controller lever when the controller lever pivots around the first axis in a brake mode direction.

20. A controller according to claim 19, characterized in that, in the brake mode, the controller outputs analog information and that in the manual mode and in the sequential mode, the controller outputs digital information.

* * * * *